United States Patent
Lui et al.

(10) Patent No.: US 11,847,149 B1
(45) Date of Patent: Dec. 19, 2023

(54) MESSAGE PROCESSING FOR JOB TITLE EXTRACTION

(71) Applicant: SetSail Technologies, Inc., Los Altos, CA (US)

(72) Inventors: Bertrand Lui, Los Altos, CA (US); Jen Hsin, Los Altos, CA (US); Darrin Gilkerson, Los Altos, CA (US); Danny Pan, Los Altos, CA (US)

(73) Assignee: SETSAIL TECHNOLOGIES, INC., Los Altos, CA (US)

( * ) Notice: Subject to any disclaimer, the term of this patent is extended or adjusted under 35 U.S.C. 154(b) by 0 days.

(21) Appl. No.: 18/139,439

(22) Filed: Apr. 26, 2023

(51) Int. Cl.
*G06F 16/33* (2019.01)
*G06Q 10/107* (2023.01)

(52) U.S. Cl.
CPC ....... *G06F 16/3344* (2019.01); *G06Q 10/107* (2013.01)

(58) Field of Classification Search
CPC .......................... G06F 16/3344; G06Q 10/107
See application file for complete search history.

(56) References Cited

U.S. PATENT DOCUMENTS

| | | | | |
|---|---|---|---|---|
| 2012/0011159 A1* | 1/2012 | Gillette | ................... | H04L 63/10 707/783 |
| 2016/0117359 A1* | 4/2016 | Jagota | ..................... | H04L 51/42 707/750 |
| 2017/0161372 A1* | 6/2017 | Fernández | ............ | G06F 40/211 |
| 2022/0147714 A1* | 5/2022 | Reyderman | ............. | H04L 51/42 |

\* cited by examiner

*Primary Examiner* — Van H Oberly
(74) *Attorney, Agent, or Firm* — CRGO Global; Steven M. Greenberg

(57) ABSTRACT

Message processing for job title extraction includes receiving a job title query for a message in a message inbox of a communications application and parsing the message into a corpus of text. Message processing for job title extraction further includes identifying a sender of the message from a header in the corpus of text and locating below the header within the corpus of text of a name of the identified sender. Message processing for job title extraction yet further includes constructing a set of n-grams from a portion of the corpus of text positionally adjacent to the located name and mapping the set of n-grams to an index of job titles in order to identify a best matching one of the job titles. Finally, message processing for job title extraction includes responding to the job title query with the matching one of the job titles.

12 Claims, 3 Drawing Sheets

MESSAGE PROCESSING FOR JOB TITLE EXTRACTION

BACKGROUND OF THE INVENTION

Field of the Invention

The present invention relates to the technical field of text processing of messages and more particularly to business data extraction from a message.

Description of the Related Art

Message processing in the context of customer relationship management (CRM) generally includes the processing of the text in a message in order to identify the context of the message. The context is then provided to a CRM system that has been enabled to map the context to an action to be performed in the CRM system, such as the scheduling of an appointment, annotating a record for a contact or a business opportunity, or automating the generation of a responsive message. Notably, in the case of integrating message processing with CRM, customarily the automation mapped to a given message depends upon the context of the message alone.

However, in many instances, an automation optimally should vary based upon the role of the sender of the message. Rudimentarily, so much would be possible where the role is expressly provided to the CRM system as part of the message, or where the identity of the message sender is known a priori so that a role can be pre-stored in a mapping and determined by reference to the contact mapped to the role. But, oftentimes the role is not expressly provided to the CRM system as part of the message. Or, the identity of the message sender is not known a priori.

In the former instance, it is left to the end user to manually investigate the role of the contact. While in complicated instances, the end user may choose to issue a generic query to a search engine in order to infer the role of the message sender, in many cases, the role can be determined based upon evidentiary text disposed in the message itself. Classically, the evidentiary text is a job title disposed within the signature block of the message sender. Thus, it would be advantageous to automatically compute the role of the message sender in reference to a job title of the message sender presented within the body of the message text.

BRIEF SUMMARY OF THE INVENTION

Embodiments of the present invention address technical deficiencies of the art in respect to job title determination for a message sender in a message communications platform. To that end, embodiments of the present invention provide for a novel and non-obvious method for message processing for job title extraction. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, a message processing method for job title extraction includes the receipt of a job title query for a message in a message inbox of a communications application and the parsing of the message into a corpus of text. The method further utilizes the name of the sender within the message, by referencing the header metadata of the message, in order to establish a portion of the message corpus most relevant in regard to identifying the role of the sender. The method yet further includes the construction of a set of n-grams (including unigrams, bigrams, positional unigrams, positional bi-grams, or any variant thereof) from a portion of the corpus of text positionally adjacent to the located name and the mapping of the set of n-grams to an index of job titles in order to identify a best matching one of the job titles. Finally, the method includes a response to the job title query with the matching one of the job titles.

In one aspect of the embodiment, the mapping includes scoring each candidate of job titles according to the tokenized matching of each of the titles against one or more n-gram databases which have been constructed to represent a job titles corpus, so that a highest scored candidate is determined to be the best matching candidate. In another aspect of the embodiment, the positioning adjacency to the located name is a position in a line immediately below the located name. In yet another aspect of the embodiment, the corpus of text is searched for terms indicative of an auto-reply and the response to the job title query is provided only if terms are not located in the corpus of text indicative of an auto-reply. Similarly, in even yet another aspect of the embodiment, the corpus of text is searched for terms indicative of a meeting invite and the response to the job title query is provided only if terms are not located in the corpus of text indicative of a meeting invite.

In another embodiment of the invention, a data processing system is adapted for message processing for job title extraction. The system includes a host computing platform that includes one or more computers, each with memory and one or processing units including one or more processing cores. The system also includes a message communications application managing a message inbox for a corresponding message recipient and also an index of job titles stored in the memory. The system yet further includes a job title extraction module that includes computer program instructions enabled while executing in the memory of at least one of the processing units of the host computing platform to receive a job title query for a message in a message inbox of a communications application, parse the message into a corpus of text, identify a sender of the message from a header in the corpus of text, locate below the header within the corpus of text a name of the identified sender, construct a set of n-grams from a portion of the corpus of text positionally adjacent to the located name, map the set of n-grams to the index of job titles in order to identify a best matching one of the job titles and to respond to the job title query with the matching one of the job titles.

In this way, the technical deficiencies of the automated determination of a role of a message sender are overcome owing to the automated extraction of a job title from a location within the corpus of text parsed from a signature block that has been positionally determined in respect to the name of the sender which corresponds to the identified sender of the message that had been referenced in a header to the message.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for message processing for job title extraction. In accordance with an embodiment of the invention, a job title extraction request can be processed in connection with a received message in a message inbox. In response to the request, the message text of the message can be parsed into a corpus of text and an identity of the sender of the message can be determined from a header to the message. Thereafter, a corresponding name of the sender of the message can be located in the corpus of the text. As such, text positionally related to the located name in the corpus of the text is extracted and a set of n-grams constructed from the extracted text. The set of n-grams are then each matched to a table of n-grams and corresponding job titles in order to score each of the n-grams according to the matching. A corresponding one of the job titles for the highest scoring one of the n-grams is then returned in response to the query as the job title of the sender of the message.

Figure 1:
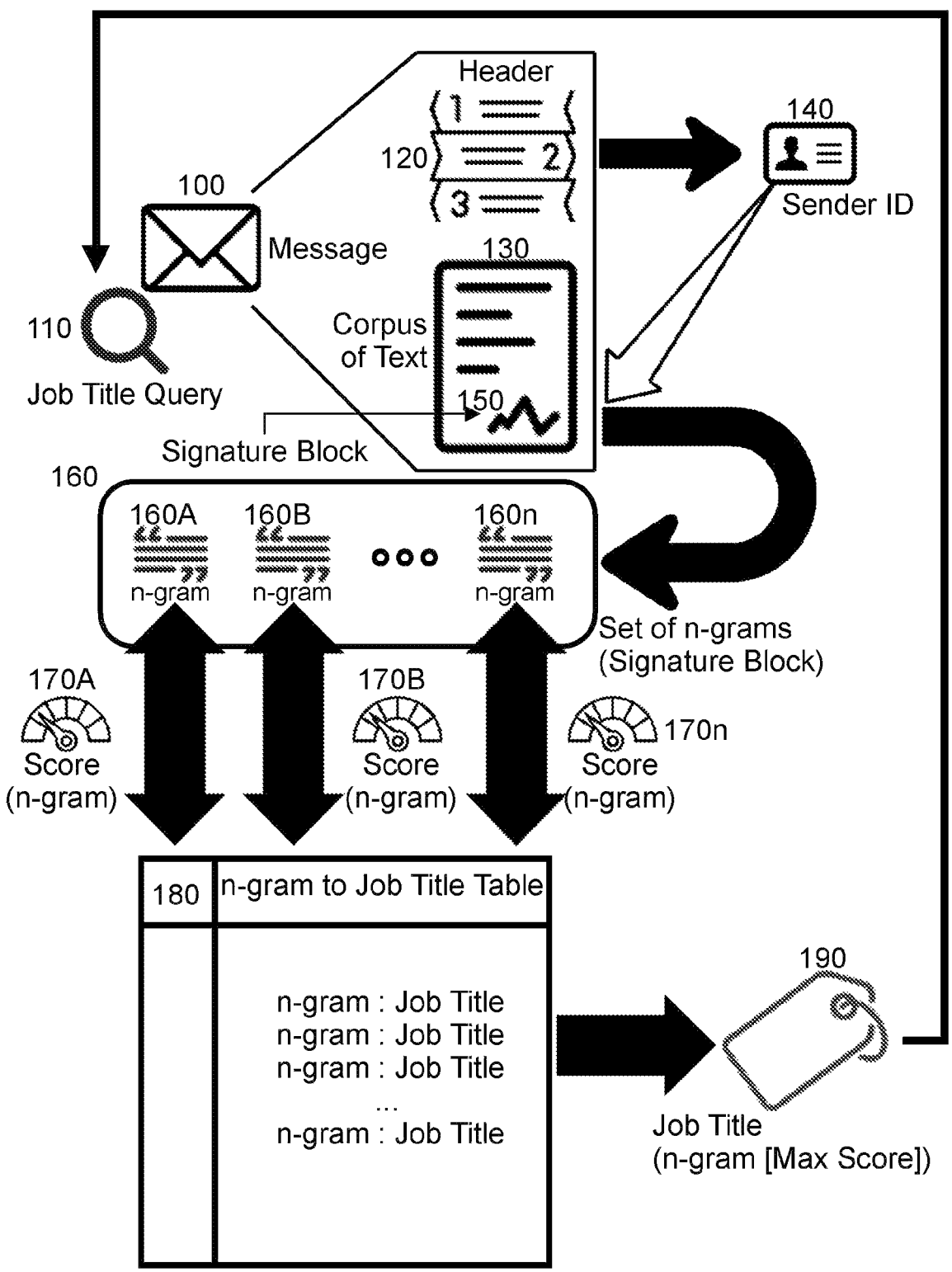
FIG. 1 is a pictorial illustration reflecting different aspects of message processing for job title extraction.

In illustration of one aspect of the embodiment, FIG. 1 pictorially shows a process of message processing for job title extraction. As shown in FIG. 1, a job title query 110 issues against a message 100 in a message inbox and in response, the message 100 is processed in accordance with the header 120 of the message 100 in order to determine a sender identity 140 for the message 100. The message 100 additionally is processed through a parsing operation in order to extract a corpus of text 130 from a body of the message 100. In this regard, the corpus of text 130 can include a data structure storing each term in the body of the message 100 and in one aspect of the embodiment, the data structure can include an index of the terms including a position in the message 100.

A signature block 150 within the corpus of text 130 can be determined by locating in the data structure a name corresponding to the sender identity 140. The terms in the corpus of text 130 having a position within a threshold proximity of the name are then determined to be the terms of the signature block 150. As such, a set of n-grams 160 is generated from the terms of the signature block 150. Each n-gram 160A, 160B, 160n in the set of n-grams is a unigram, a bigram or a positional n-gram in order to account for all terms in the signature block 150 of the corpus of text 130. That is to say, for each term in the signature block 150, one or more of a unigram, bigram, positional unigram or positional bigram can be constructed so that the aggregation of all produced n-grams become the set of the n-grams 160. Subsequently, each n-gram 160A, 160B, 160n is compared as a key to table 180.

More specifically, the table 180 can include one or more n-gram databases. Each n-gram database is constructed by correlating training data of a large corpus of job titles with different n-grams so that each job title is related to one or more n-grams with each relation of job title to n-gram include a weight representative of a strength of association between the n-gram and the job title. As such, the mapping of a set of each corresponding one of the n-grams 160A, 160B, 160n to the table 180 produces a number of weights which can be composited in order to produce a score 170A, 170B, 170n for each corresponding one of the n-grams 160A, 160B, 160n indicative of a degree of matching of each n-gram 160A, 160B, 160n in the table 180. Thereafter, a highest of the scores 170A, 170B, 170n is determined and the corresponding job title 190 in the table 180 is returned in response to the job title query 110.

Figure 2:
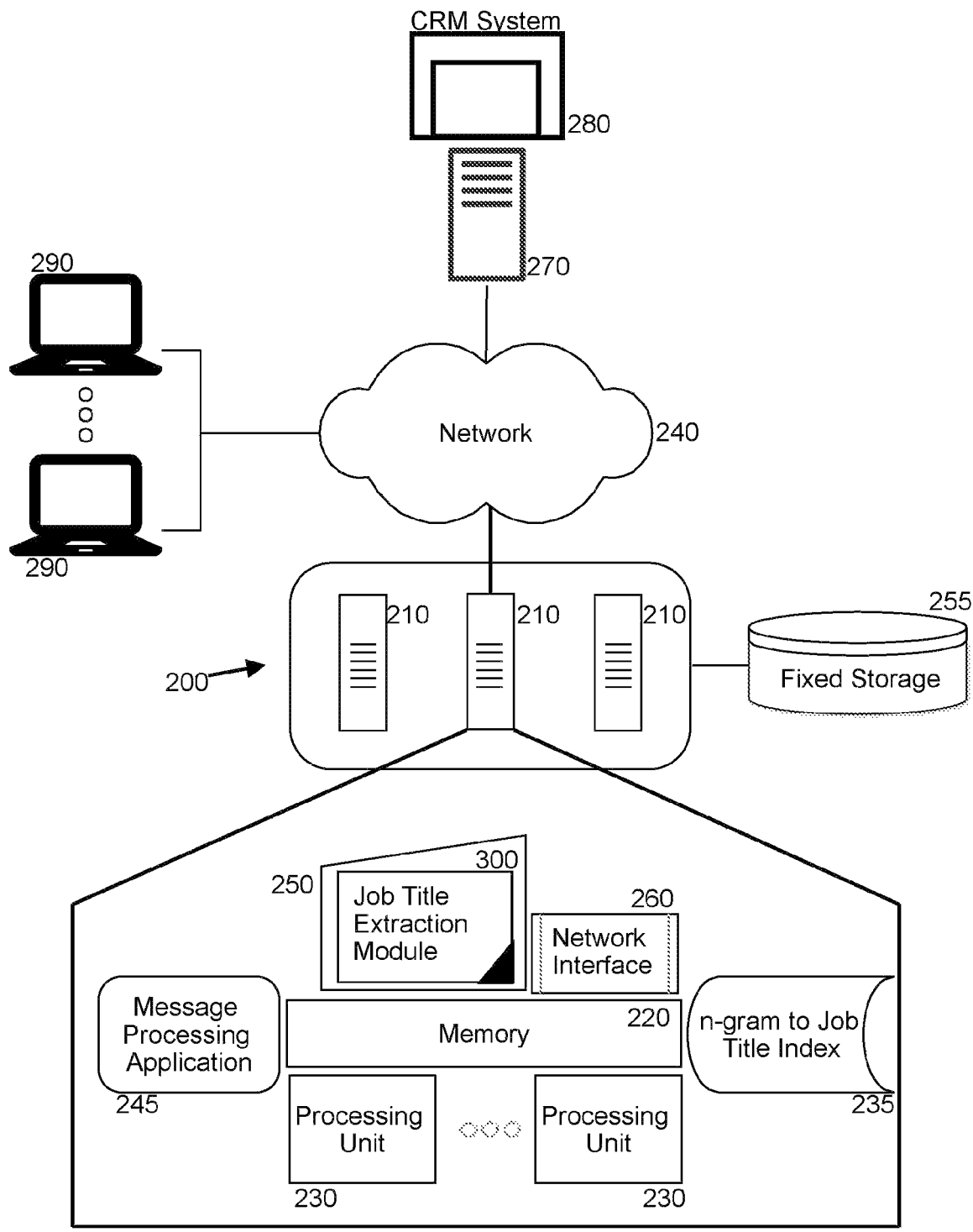
FIG. 2 is a block diagram depicting a data processing system adapted to perform one of the aspects of the process of FIG. 1; and, FIG. 3 is a flow chart illustrating one of the aspects of the process illustrated within FIG. 1.

Aspects of the process described in connection with FIG. 1 can be implemented within a data processing system. In further illustration, FIG. 2 schematically shows a data processing system adapted to perform message processing for job title extraction. In the data processing system illustrated in FIG. 1, a host computing platform 200 is provided. The host computing platform 200 includes fixed storage 255 and one or more computers 210, each with memory 220 and one or more processing units 230. The computers 210 of the host computing platform (only a single computer shown for the purpose of illustrative simplicity) can be co-located within one another and in communication with one another over a local area network, or over a data communications bus, or the computers can be remotely disposed from one another and in communication with one another through network interface 260 over a data communications network 240. The host computing platform 200 further hosts the operation of a message processing application 245 processing messages in different inboxes of different end users accessing the messages from remotely disposed client devices 290.

Notably, a computing device 250 including a non-transitory computer readable storage medium can be included with the data processing system 200 and accessed by the processing units 230 of one or more of the computers 210. The computing device stores 250 thereon or retains therein a program module 300 that includes computer program instructions which when executed by one or more of the processing units 230, performs a programmatically executable process for message processing for job title extraction. Specifically, the program instructions during execution extract a message sender identity of a message in a message inbox of a message processing application 245 and parse a body of the message into a corpus of text.

The program instructions further generate an index of terms in the corpus of text and select a subset of the terms proximally related to a name in the index corresponding to the message sender identity. Thereafter, the program instructions generate a set of n-grams from the subset of terms. Each of the n-grams are then submitted to a table of n-grams to job titles as a key to determine a match (and a corresponding job title). Each instance of a match of n-gram to job title results in an augmentation of a score for the job title. As such, one of the job titles in the table receiving a highest number of matches is then determined to be a job title of the sender of the message. Finally, the program instructions provide the job title as input to a contact record in a remotely disposed CRM system 280 executing in a host device 270 over the data communications network 240.

Figure 3:
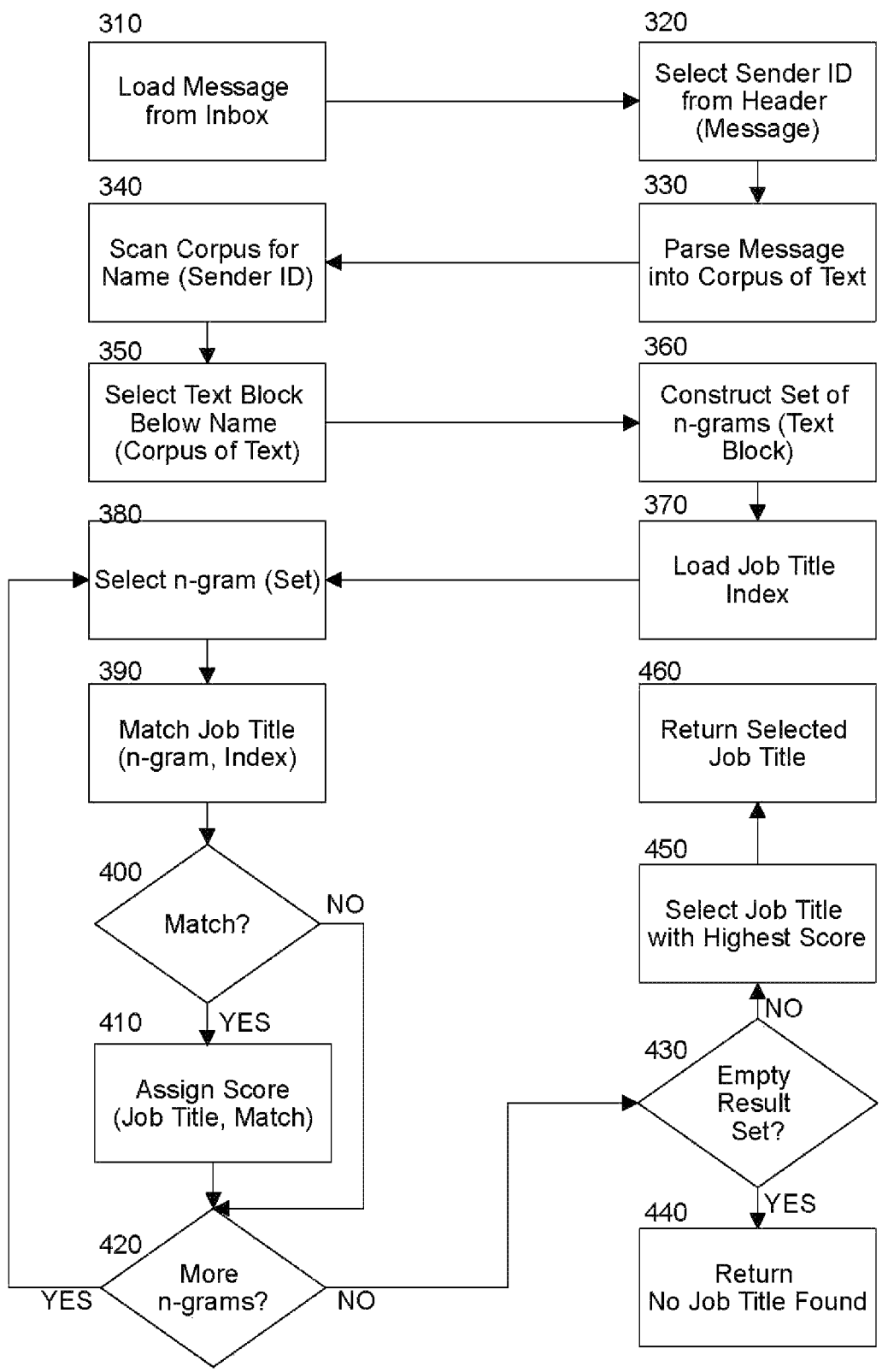

In further illustration of an exemplary operation of the module, FIG. 3 is a flow chart illustrating one of the aspects of the process of FIG. 1. Beginning in block 305, in response to a job title extraction query, a message is loaded into memory from an inbox of a message communications system. In block 320, a sender identifier for the sender of the message is determined from the header of the message. Then, in block 330 the message is parsed into a corpus of text including a multiplicity of terms. In one aspect of the embodiment, the terms are organized into an index indicating a position within the message so that a relative position between each of the terms can be computed. Optionally, it is determined from the terms in the index whether or not the message is an "auto-reply" for instance by locating the term "auto-reply", or if the message if a calendar invite for instance by locating the term "invitation" or by locating an indication in the header of a calendar invite attachment. In either circumstance, the process ends. But otherwise, the process continues through block 340.

Specifically, in block 340, a term in the index is identified as corresponding to the sender identifier. Consequently, in block 350 a block of text is identified as inclusive of the terms within a proximal location of the term in the index identified as corresponding to the sender identifier. For instance, the terms in a discrete number of lines below the name can be selected as belonging to the block of text. Thereafter, in block 360, a set of n-grams is constructed from the terms in the block of text.

In block 370, a job title index is retrieved and loaded into memory. In block 380, a first n-gram in the set is selected and in block 390 the selected n-gram is submitted for matching to an entry in the index corresponding to a particular job title. In decision block 400, if a match is not found, in decision block 420 it is then determined if additional n-grams in the set remain to be processed. If so, the process returns to block 380 with the selection of a next n-gram in the set. Otherwise, in decision block 400 if a match is found, in block 410 the job title is assigned a score indicative of a number of times a submitted n-gram has matched to the corresponding entry. Thereafter, once again, in decision block 400 it is then determined if additional n-grams in the set remain to be processed. If so, the process repeats through block 380 with a selection of a new n-gram in the set.

In decision block 420, when no more n-grams remain to be processed, in decision block 430 it is determined if at least one entry in the index has been matched to at least one of the n-grams in the set. If not, in block 440, an indication of no job title found is returned in response to the job title extraction query. By comparison, in decision block 430 if it is determined that at least one entry in the index has been matched to at least one of the n-grams in the set, in block 450 the entry in the index having the highest score is selected and in block 460 the corresponding job title is returned in response to the job title extraction query.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A message processing method for job title extraction comprising:
   receiving a job title query for a message in a message inbox of a communications application;
   parsing the message into a corpus of text;
   searching the corpus of text for terms indicative of either a meeting invite or an auto-reply and providing a response to the job title query only if terms are not located in the corpus of text indicative of either the meeting invite or the auto-reply, the response comprising:
   identifying a sender of the message from a header in the corpus of text;
   locating below the header within the corpus of text a name of the identified sender;
   constructing a set of n-grams from a portion of the corpus of text positionally adjacent to the located name;
   mapping the set of n-grams to an index of job titles in order to identify a best matching one of the job titles; and,
   responding to the job title query with the matching one of the job titles.

2. The method of claim 1, wherein the mapping includes scoring each matching one of the job titles according to a number of matches of corresponding ones of the n-grams so that a highest scored one of the job titles is determined to be the best matching one of the job titles.

3. The method of claim 1, wherein the set of n-grams is a set of positional n-grams.

4. The method of claim 1, wherein the positioning adjacency to the located name is a position in a line immediately below the located name.

5. A data processing system adapted for message processing for job title extraction, the system comprising:
   a host computing platform comprising one or more computers, each with memory and one or processing units including one or more processing cores; and,
   a job title extraction module comprising computer program instructions enabled while executing in the memory of at least one of the processing units of the host computing platform to perform:
   receiving a job title query for a message in a message inbox of a communications application;
   parsing the message into a corpus of text;
   searching the corpus of text for terms indicative of either a meeting invite or an auto-reply and providing a response to the job title query only if terms are not located in the corpus of text indicative of either the meeting invite or the auto-reply, the response comprising:
   identifying a sender of the message from a header in the corpus of text;
   locating below the header within the corpus of text a name of the identified sender;
   constructing a set of n-grams from a portion of the corpus of text positionally adjacent to the located name;
   mapping the set of n-grams to an index of job titles in order to identify a best matching one of the job titles; and,
   responding to the job title query with the matching one of the job titles.

6. The system of claim 5, wherein the mapping includes scoring each matching one of the job titles according to a number of matches of corresponding ones of the n-grams so that a highest scored one of the job titles is determined to be the best matching one of the job titles.

7. The system of claim 5, wherein the set of n-grams is a set of positional n-grams.

8. The system of claim 5, wherein the positioning adjacency to the located name is a position in a line immediately below the located name.

9. A computing device comprising a non- transitory computer readable storage medium having program instructions stored therein, the instructions being executable by at least one processing core of a processing unit to cause the processing unit to perform message processing for job title extraction by:
   receiving a job title query for a message in a message inbox of a communications application;
   parsing the message into a corpus of text;
   searching the corpus of text for terms indicative of either a meeting invite or an auto-reply and providing a response to the job title query only if terms are not located in the corpus of text indicative of either the meeting invite or the auto-reply, the response comprising:
   identifying a sender of the message from a header in the corpus of text;
   locating below the header within the corpus of text a name of the identified sender;
   constructing a set of n-grams from a portion of the corpus of text positionally adjacent to the located name;
   mapping the set of n-grams to an index of job titles in order to identify a best matching one of the job titles; and,
   responding to the job title query with the matching one of the job titles.

10. The device of claim 9, wherein the mapping includes scoring each matching one of the job titles according to a number of matches of corresponding ones of the n-grams so that a highest scored one of the job titles is determined to be the best matching one of the job titles.

11. The device of claim 9, wherein the set of n-grams is a set of positional n-grams.

12. The device of claim 9, wherein the positioning adjacency to the located name is a position in a line immediately below the located name.

* * * * *